July 11, 1961

C. A. PETHYBRIDGE 2,991,991

GEAR-HARDENING MACHINE

Filed Oct. 18, 1955

INVENTOR.
CHARLES A. PETHYBRIDGE
BY
Mitchell & Bechert
ATTORNEYS

July 11, 1961  C. A. PETHYBRIDGE  2,991,991
GEAR-HARDENING MACHINE
Filed Oct. 18, 1955  2 Sheets-Sheet 2
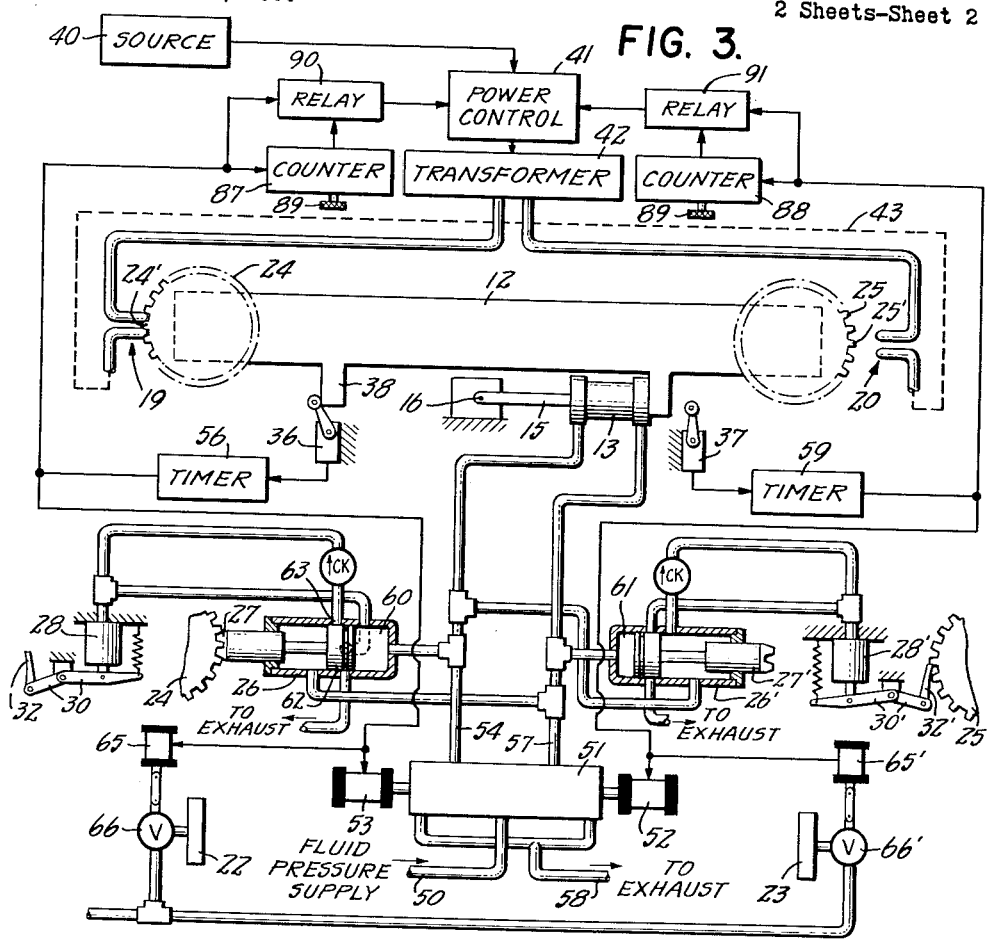
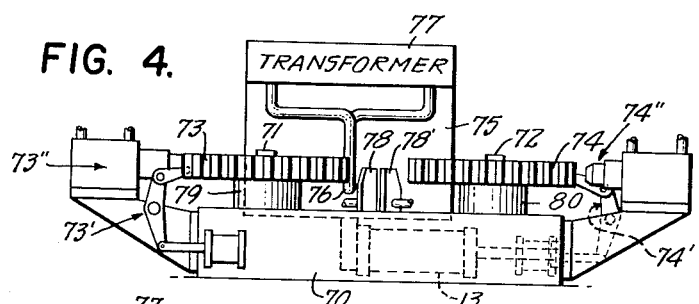
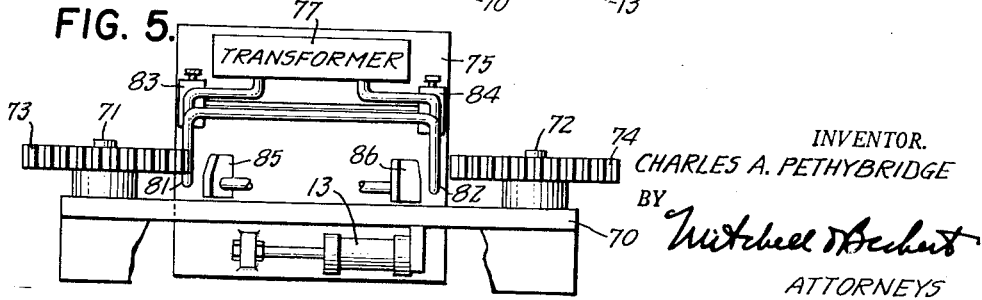
INVENTOR.
CHARLES A. PETHYBRIDGE
BY
Mitchell Bechert
ATTORNEYS United States Patent Office 2,991,991
Patented July 11, 1961

2,991,991
GEAR-HARDENING MACHINE
Charles A. Pethybridge, New Britain, Conn., assignor to The New Britain Machine Company, New Britain, Conn., a corporation of Connecticut
Filed Oct. 18, 1955, Ser. No. 541,210
13 Claims. (Cl. 266—4)

My invention relates to a heat-treating device, and in particular to an improved induction-hardening device for treating gear teeth. This application discloses improvements and modifications over those in Gridley Patent 2,582,929 and in my copending application, Serial No. 784,414, filed December 24, 1958.

It is an object of the invention to provide an improved means for heat-treating gear teeth.

It is an object to provide an improved gear-tooth heat-treating device in which a large number of types and sizes of gears may be readily accommodated.

It is a further object to provide a device of the character indicated in which the duty cycle of the heating means may be optimized.

It is a further object to provide a device meeting the above objects and inherently capable of substantially increased productivity of heat-treated gears.

It is a specific object to provide a gear heat-treating device capable of processing two gears at a time, and utilizing a single source of electrical supply, without loading such supply beyond the capacity required for heat-treating a single gear tooth.

Other objects and various further features of novelty and invention will become apparent or will occur to those skilled in the art from a reading of the following specification in conjunction with the accompanying drawings. In said drawings, which show, for illustrative purposes only, preferred forms of the invention:

FIG. 3 is a diagram schematically showing interconnections of parts of the device of FIGS. 1 and 2 for purposes of progressing an automatic cycle of the machine; and FIGS. 4 and 5 are simplified diagrams illustrative of alternative embodiments.

Briefly stated, my invention contemplates a heat-treating device in which two gear supports are positioned to support two gears for alternate coaction with heat-treating means in such manner that time not devoted strictly to the heating process may be cut to an absolute minimum.

In one general form, separate heat-treating elements are fixedly positioned, and the gear supports are mounted on a slide. Reciprocating feed means in one half of an alternating cycle places a tooth to be treated on one gear in heat-treating relation with the adjacent heat-treating element; in the other half of the cycle, the feed means places a corresponding tooth of the other gear in similar relation with the other heat-treating element. Common supply means are provided for the two heat-treating elements, and the need for switching power is obviated because power will automatically be dissipated at the tooth which happens at any one time to be placed in coupled relation with the loop of a particular one of heat-treating elements.

In the other general form to be described, the gear spindles are fixed, and the heat-treating head is on the slide and intermediate the two gears to be heat treated. In one embodiment, separate heat-treating elements are used for separate engagement with the two gears, and in another embodiment the same heat-treating element alternately assumes a coupled relation with teeth of the two gears.

Figure 1:
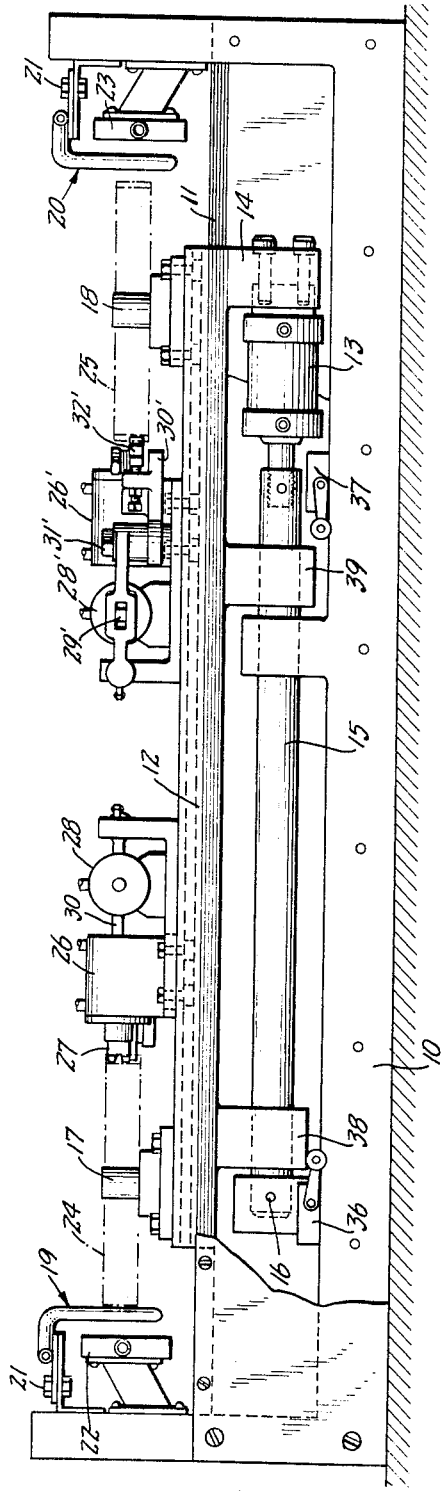
FIG. 1 is a front elevation of a machine incorporating features of the invention.
Figure 2:
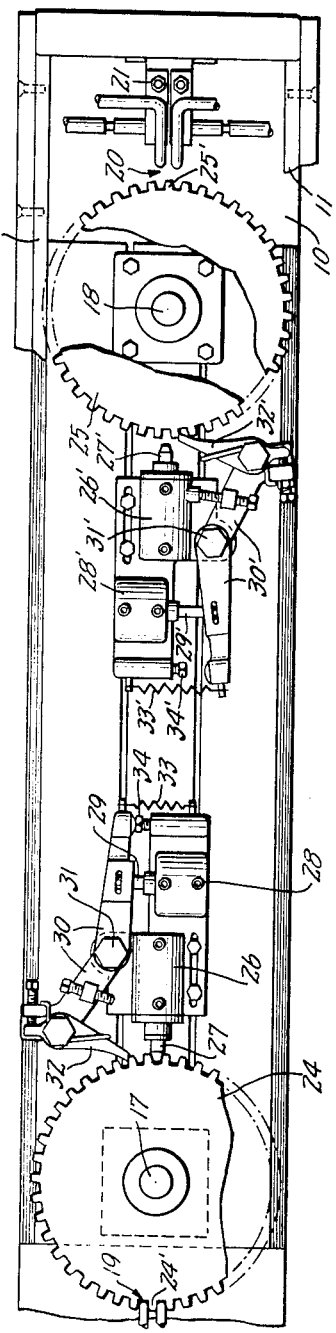
FIG. 2 is a plan view of the machine in FIG. 1, with certain parts broken away.

Referring to FIGS. 1 to 3 of the drawings, my invention is shown in application to a machine comprising a frame 10 having elongated guide means 11 in which a slide 12 is longitudinally reciprocable. Reciprocation may be accomplished manually, but, in the form shown, I provide double-acting hydraulic means 13 for the purpose. The means 13 is shown to comprise a cylinder fixed at 14 to the slide, and a stem 15 fixed at 16 to the frame 10.

The gear supports or spindles 17—18 may be carried at longitudinally spaced locations on the slide 12, and the heat-treating elements 19—20 may be carried on suitable brackets 21 at the respective ends of the frame 10. Elements 19—20 are shown as similar loops, defining the output circuits of high-frequency induction-hardening means. The heat-treating means may further include quenching heads 22—23, and the heads and elements 19—20—22—23 are supplied and energized by automatic means to be described in connection with FIG. 3.

In order to angularly position the gears 24—25 on spindles 17—18, particularly for automatic use of my machine, I prefer to employ automatic locating and indexing means in conjunction with each gear. Such indexing and locating means may resemble that disclosed in greater detail in my said copending application, and it suffices here to state that the locating means, say, for the gear 24, may comprise a hydraulic cylinder 26 of the double-acting variety for longitudinally positioning a locating member 27 in engagement with teeth of the gear 24. The indexing means may comprise a single-acting cylinder 28 having a stem 29 in actuating relation with a bell-crank 30. The crank 30 is pivoted at 31 to the slide and carries a pivoted pawl 32 for driving engagement with teeth of the gear 24. A spring 33 serves to return crank 30 to a home position against an abutment or stop 34. Parts for the indexing and locating means for gear 25 may be exactly the same as described for gear 24 and have, therefore, been given the same reference numbers, with primed notation.

To complete the description of parts, I show provision of limit switches 36—37 at longitudinally spaced locations and responsive to achievement of limiting reicprocated positions of the slide 12, such that, on the one hand, when a tooth 24' of gear 24 is in heat-treating relation with the element 19, a lug 38 on the slide 12 actuates switch 36. In said limiting position, teeth of gear 25 are out of possible heat-treating relation with the element 20. For the other limiting position of slide 12, a lug 39 actuates switch 37, and a tooth 25' of gear 25 is in heat-treating relation with the element 20, while the teeth of gear 24 are removed from such relation with element 19.

In accordance with a feature of my invention, the separate elements 19—20 of the heat-treating means may be connected in common to the same power supply, which is shown (FIG. 3) to comprise a source 40 of high-frequency energy, power-control means 41, and a transformer 42. Both elements 19—20 may be connected to the same output circuit of the transformer 42, and the dashed line 43 suggests a series connection of these elements. As long as there are teeth to be heat-treated, the transformer 42 may be continuously energized, and heating power is delivered and dissipated only when a tooth, say the tooth 24', of gear 24 is in coupled relation with the adjacent element 19. Since the corresponding tooth 25' of gear 25 is then out of coupled relation with the element 20, no power is delivered or dissipated at element 20 for the position of the parts shown in FIGS. 1, 2, and 3. When the slide 12 is shifted to its other limiting position, however, the mere placement of tooth 25' in heating relation with the element 20 and the removal of tooth 24' from such relation with element 19 is effective to transfer the location of delivered power, without requiring switching means.

A better understanding of the operation of my device may be had by reference to FIG. 3, in which hydraulic energy for controlling the feed cylinder 13 is available from a supply 50, as controlled by a so-called four-way valve 51. Solenoids 52—53 are shown for shifting the valve 51 from one to the other of its two possible positions. In the position of the parts shown, pressure fluid is being delivered in line 54 to the tail end of cylinder 13, so as effectively to displace slide 12 to the left in the sense of the drawings, thereby positioning tooth 24' in coupled relation with element 19; to control this position, solenoid 52 was energized by means to be later described.

Once slide 12 reaches the position described, that is, with tooth 24' coupled to element 19, limit switch 36 closes to actuate a timer 56, preset to determine a given heating interval. As explained above, heating commences automatically as soon as the tooth 24' is coupled to the element 19 and, therefore, the timer 56 need only determine how long this coupled relation is to exist for purposes of temperature development and heat penetration, in accordance with the desired treatment.

Upon determination of the preselected time interval, timer 56 is effective to energize solenoid 53 at least for a period of time sufficient to shift valve 51 to its other position and thus to determine supply of pressure fluid in line 57 and connection of line 54 to the exhaust 58. This reversal of supply connections shifts slide 12 to the right and thus decouples tooth 24' from element 19, and at the same time couples tooth 25' in heat-treating relation with the element 20. Upon achievement of this second position, switch 37 is actuated to initiate a function of timer 59, and upon termination of the prescribed heating interval, timer 59 energizes solenoid 52 to control a shifting of the valve 51 and a recycling of the described feed functions.

Coordinated with the described feed functions, I provide independent indexing and locating functions for the gears 24—25. For the position of the parts shown, that is, with pressure-fluid supply in line 54, the same pressure fluid is supplied to the head end 60 of the actuator 26 for tooth locator 27, thus assuring positive location of gear 24 while being heat treated. At the same time, line 57 is connected to exhaust the tail end of cylinder 26 and the head end 61 of actuator 26', while pressure fluid is supplied to the tail end of actuator 26' to retract the same from engagement with gear 25.

Upon shifting of valve 51 in the direction controlling displacement to the right in the sense of the drawing, the head 60 of cylinder 26 is connected to exhaust, and as piston 62 thereof is retracted, a control port 63 is uncovered so as to supply pressure fluid to the cylinder 28, governing a tooth-indexing operation of the pawl 32. Thus, indexing is quickly completed upon retraction of the locator 27, and upon shifting of slide 12 to the right. In like manner, indexing and locating functions occur at gear 25 in opposed phase relation with the functions described for gear 24. For a more detailed discussion of the operation of individual indexing and locating mechanisms, reference may be had to my said copending application.

As explained above, solenoid 53 is actuated to determine feed of slide 12 to the right and, therefore, to cut off the heating of tooth 24'. The impulse determining this function may also initiate quenching, as governed by a solenoid 65 in controlling relation with a fluid valve 66, governing admission of quenching fluid to the head 22. The solenoid 65 preferably incorporates delay drop-out functions, so that quenching may be maintained as long as desired, consistent with the heating cycle. Quenching at the head 23 is governed by similar mechanism 65'—66' actuated coincidentally with the solenoid 52, and thus, upon shifting the slide 12 to the left in the sense of the drawings.

In FIG. 4, I show a simplified view of an alternative embodiment in which the frame 70 carries the gear supports or spindles 71—72 for gears 73—74. The heat-treating means is carried on a slide 75, guided by means (not shown) on the frame 70 and, in the form shown, the heat-treating means comprises but a single loop element 76 supplied by the transformer 77. The reciprocating means 13 for the slide 75 and frame 70, and also the individual indexing means (73'—74') and locating means (73"—74") for gears 73—74, may resemble those described in connection with FIGS. 1 to 3, except, of course, that the indexing and locating means will be based on the frame instead of on the slide. Such means are not shown in detail because they will be readily understood.

In the situation depicted in FIG. 4, the slide 75 has been displaced to the left, and the element 76 is coupled to a tooth of the gear 73. It will be understood that, upon a shift of slide 75 to the right, element 76 will be decoupled from the tooth of gear 73 and will become coupled to a tooth of the gear 74. It will be understood that separate qeunching means 78, for application against a heated tooth of gear 73 (and 78', for application against a similar tooth of gear 74), may be energized and supplied in a manner analogous to that described in connection with FIG. 3. The quenching heads 77—78 may be carried with the heat-treating element 76 and, therefore, by the slide 75; however, in the form shown, heads 78—78' are fixed to the frame 70, the head 78 being to one side of the vertical plane of spindles 71—72, and the head 78' being on the other side of said plane. For the arrangement shown in FIG. 4, variously sized gears may be readily accommodated by providing the spindles 71—72 on bases 79—80, longitudinally adjustably positionable on the frame 70 and releasably securable (by means not shown) in such positions.

In the arrangement of FIG. 5, most of the parts are essentially the same as described in connection with FIG. 4, except that separate heat-treating elements 81—82 are provided for coaction with the teeth of separate gears 73—74. The principal difference in the arrangement of FIG. 5 is that elements 81—82 may be adjustably mounted on separate bases 83—84 longitudinally adjustably securable on the slide 75, so that the gear-spindle locations may be relatively fixed at all times, and different gear sizes may be accommodated by adjustably setting the heat-treating bases 83—84. The quenching heads 85—86 are shown carried on the slide, so that the heat treating means (81—82, 85—86) may be said to be reciprocated bodily by movement of slide 70 in FIG. 5.

It will be appreciated that I have described an improved means for heat-treating gear teeth, whereby better time-utilization may be had of the source of heat energy; in other words, a maximum duty cycle is provided. The arrangement lends itself to use of a single or common supply to the heating means for teeth of the respective gears, and to elimination of power-switching means. By employing separate counters 87—88 (FIG. 3), including adjustable means at 89 for preselection of count in accordance with number of gear teeth, individual counts may be made automatically of the number of teeth processed on each gear so that, upon completion of the treatment of all teeth of a particular gear (24), a relay 90 may operate the power control to disconnect the supply of power during that part of the automatic cycle during which the fully treated gear would have been further heat-treated. A similar relay 91 responds to counter 88 in the same manner, and the arrangement and connection of relays 90—91 to the power control 41 is preferably such that all power is shut off when both gears have been fully treated. Ordinarily, however, it is to be preferred that one gear be substantially half heat-treated at the time the other gear is commencing heat-treatment. This simplifies the loading problem and enables the machine to be kept in constant operation, allowing for the loading of one gear at a time.

While I have described the invention in detail for the preferred forms shown, it will be understood that modifications may be made within the scope of the invention as described in the claims which follow.

I claim:

1. In a heat-treating device of the character indicated, a frame-based support member including elongated guide means, a slide member slidable along said guide means, two longitudinally spaced gear supports on one of said members and two longitudinally spaced induction heat-treating elements on the other of said members, a single source of electrical supply for said heat-treating elements; said gear supports being so disposed that a gear on one of said supports may be positioned in heat-treating relation with one of said elements for one longitudinal position of said slide, while a gear on the other of said supports is longitudinally spaced from heat-treating relation with the other of said elements; said gear supports being further disposed so that for another longitudinal position of said slide the gear on said other support is positioned in heat-treating relation with said other element, while the gear on said one support is longitudinally spaced from heat-treating relation with said one element; and reciprocating feed means for traversing said slide between said positions; whereby the duty cycle for said supply may be optimized.

2. In a heat-treating device of the character indicated, a frame-based support member including elongated guide means, a slide member slidable along said guide means, two longitudinally spaced gear supports on one of said members and two longitudinally spaced induction heat-treating elements on the other of said members, a single source of electrical supply for said heat-treating elements; said gear supports being so disposed that a gear on one of said supports may be positioned in heat-treating relation with one of said elements for one longitudinal position of said slide, while a gear on the other of said supports is longitudinally spaced from heat-treating relation with the other of said elements; said gear supports being further disposed so that for another longitudinal position of said slide the gear on said other support is positioned in heat-treating relation with said other element, while the gear on said one support is longitudinally spaced from heat-treating relation with said one element; reciprocating feed means for traversing said slide, separate indexing means for the respective gears supported on said gear-supporting means, and means synchronizing indexing operations with the feed cycle of said feed means so as to accomplish indexing for each gear when such gear is out of heat-treating relation with the heat-treating element therefor.

3. In a heat-treating device of the character indicated, a frame-based support member including elongated guide means, a slide member slidable along said guide means, two longitudinally spaced gear supports on one of said members and two longitudinally spaced induction heat-treating elements on the other of said members, a single electrical supply for said elements; said gear supports being so disposed that a gear on one of said supports may be positioned in heat-treating relation with one of said elements for one longitudinal position of said slide, and so that a gear on the other of said supports may be similarly positioned with respect to the other of said elements for another longitudinal position of said slide; reciprocating feed means for traversing said slide, separate indexing means for the respective gears supported on said gear supports, separate locating means for the respective gears supported on said gear-supporting means, each of said locating means being positively actuated into and out of locating relation with a gear on the gear support adjacent thereto, and means synchronizing indexing operations with the feed cycle of said feed means so as to accomplish indexing for each gear when such gear is out of heat-treating relation with the heat-treating element therefor, said synchronizing means being further disposed to separately actuate each said locating means so as to accomplish location of each gear when in heat-treating relation with the heat-treating element therefor.

4. In a machine of the character indicated, a frame including elongated guide means, a slide slidable on said guide means, two gear-supporting spindles in longitudinally spaced relation on one slide, heat-treating means including two induction heat-treating heads positioned in longitudinally spaced relation on said frame and so arranged as to embrace a gear tooth to be heat-treated on the gear adjacent thereto for opposite limits of the feed travel of said slide, said heat-treating means further including common electrical power-supply means to said heat-treating heads, and means responsive to displacement of said slide into one of said limiting positions for causing one heat-treating head to transfer heating energy to the exclusion of the other head, said last-mentioned means being also responsive to displacement of said slide into the other of said limiting positions for causing the other of said heat-treating heads to transfer heating energy to the exclusion of said one head.

5. In a machine of the character indicated, a frame including elongated guide means, a slide slidable on said guide means, two gear-supporting spindles in longitudinally spaced relation on said slide, two induction heat-treating heads positioned in longitudinally spaced relation on said frame and so arranged as to embrace a gear tooth to be heat-treated on the gear adjacent thereto for opposite limits of the feed travel of said slide, each said heat-treating head being out of heat-treating relation with the adjacent gear whenever said slide is shifted to place the other heat-treating head in heat-treating relation with the other gear, common electric power-supply means to said heat-treating elements, and automatic means responsive to displacement of said slide to one of said limiting positions for indexing the gear at the other end of said slide, said automatic means being responsive to displacement to the other limiting position of said slide for indexing the gear supported at said one end.

6. In a heat-treating device of the character indicated, a frame member including elongated guide means, a slide member slidable on said guide means, two gear-supporting spindles at longitudinally spaced locations on one of said members and at opposite ends of the other of said members, induction heat-treating means carried by said other member and positioned intermediate gears on said spindles for heat-treating relation with a tooth of one gear to the exclusion of the other gear for one limit of displacement of said slide member and for heat-treating relation with the other gear to the exclusion of the one gear for the other limit of movement of said slide member, a single electrical supply means for said induction heat-treating means, and separate indexing means for said gears and effective alternately to index said gears for shifting displacements of said slide member from one to the other of said limiting positions.

7. In a heat-treating device of the character indicated, a frame member including elongated guide means, a slide member slidable on said guide means, two gear-supporting spindles at longitudinally spaced locations on one of said members and at opposite ends of the other of said members, induction heat-treating means carried by said other member and positioned intermediate gears on said spindles for heat-treating relation with a tooth of one gear to the exclusion of the other gear for one limit of displacement of said slide and for heat-treating relation with the other gear to the exclusion of the one gear for the other limit of movement of said slide member, a single electrical source for said heat-treating means, separate indexing means for said gears and effective alternately to index said gears for shifting displacements of said slide member from one to the other of said limiting positions, and separate locating means for said gears and effective alternately to locate said gears when in heating position and to free said gears for indexing when out of heating position.

8. In a heat-treating device of the character indicated, a frame member including elongated guide means, a slide member slidable on said guide means, two gear-supporting spindles at longitudinally spaced locations on one of said members and at opposite ends of the other of said members, induction heat-treating means carried by said other member and positioned intermediate gears on said spindles for heat-treating relation with a tooth of one gear to the exclusion of the other gear for one limit of displacement of said slide and for heat-treating relation with the other gear to the exclusion of the one gear for the other limit of movement of said slide member, said heat-treating means comprising separate heads separately positionable in heat-treating relation with said gears, and common electrical power-supply means for said separate heads.

9. In a heat-treating device of the character indicated, a frame member including elongated guide means, a slide member slidable on said guide means, two gear-supporting spindles at longitudinally spaced locations on one of said members and at opposite ends of the other of said members, heat-treating means carried by said other member and positioned intermediate gears on said spindles for heat-treating relation with a tooth of one gear to the exclusion of the other gear for one limit of displacement of said slide member and for heat-treating relation with the other gear to the exclusion of the one gear for the other limit of movement of said slide member, said heat-treating means comprising a single heat-treating element, and a single source energizing said element, whereby the duty cycle of utilization of said element and said source may be optimized.

10. A device according to claim 9, in which said source is an alternating-current source and is continuously connected in energizing relation with said element, said element being a conductive loop shaped for inductive coupling to a ferromagnetic gear tooth, whereby heating power is transferred to a tooth to be heat-treated immediately upon placement of the tooth in coupled relation with said element.

11. In a heat-treating device of the character indicated, a frame-based support member including elongated guide means, a slide member slidable along said guide means, two longitudinally spaced gear supports on one of said members and two longitudinally spaced heat-treating elements on the other of said members, each of said heat-treating elements comprising a conductive loop including a loop portion shaped for inductive coupling to a ferromagnetic gear tooth; said loop portions being in planes generally transverse to movement on said guide means and said gear supports being so disposed that a gear on one of said supports may be positioned in heat-treating relation with one of said elements while a gear on the other of said supports is removed from heat-treating relation with the other of said elements for one longitudinal position of said slide member, and so that the gear on the other of said supports may be similarly positioned in heat-treating relation with the other of said elements while the gear on said one support is removed from heat-treating relation with said one element for another longitudinal position of said slide member; reciprocating feed means for traversing said slide member between said positions, and a single high-frequency electrical source continuously connected to said heat-treating elements, whereby heat-generation is automatically transferred from a tooth of one gear to a tooth of the other gear merely upon reciprocation of said slide, and whereby the operating duty cycle is optimized.

12. A device according to claim 11, in which said heat-treating elements form separate series-connected halves of the same loop connected to said source.

13. A device according to claim 11, in which said heat-treating means includes separate quenching means for the heated teeth of said gears, and means synchronized with operation of said feed means for quenching a heated tooth as the heat-treating element therefor is moved out of coupled relation thereto.

References Cited in the file of this patent

UNITED STATES PATENTS

| | | |
|---|---|---|
| 2,199,313 | Holler | Apr. 30, 1940 |
| 2,390,559 | Sherman | Dec. 11, 1945 |
| 2,454,039 | Cox | Nov. 16, 1948 |
| 2,521,699 | Denneen et al. | Sept. 12, 1950 |
| 2,524,044 | Denneen et al. | Oct. 3, 1950 |
| 2,582,929 | Gridley | Jan. 15, 1952 |
| 2,747,581 | Granstedt | May 29, 1956 |

FOREIGN PATENTS

| | | |
|---|---|---|
| 489,368 | Germany | Jan. 16, 1930 |
| 630,844 | Germany | June 6, 1936 |

UNITED STATES PATENT OFFICE
CERTIFICATE OF CORRECTION

Patent No. 2,991,991                           July 11, 1961

Charles A. Pethybridge

It is hereby certified that error appears in the above numbered patent requiring correction and that the said Letters Patent should read as corrected below.

Column 6, line 7, for "one" read -- said --.

Signed and sealed this 28th day of November 1961.

(SEAL)
Attest:

ERNEST W. SWIDER
Attesting Officer

DAVID L. LADD
Commissioner of Patents

USCOMM-DC